United States Patent

[11] 3,571,580

[72] Inventors John S. Buchan
Ottawa;
Leonard C. Beaumont, Kanata, Ontario, Canada
[21] Appl. No. 797,077
[22] Filed Feb. 6, 1969
[45] Patented Mar. 23, 1971
[73] Assignee Northern Electric Company Limited
Montreal, Quebec, Canada

[54] DEVICE FOR DETERMINING LEAST SIGNIFICANT "ONE" IN A BINARY WORD
4 Claims, 1 Drawing Fig.

[52] U.S. Cl. .......... 235/152, 235/168
[51] Int. Cl. .......... G06f 7/385, G06f 7/00, G06f 7/06
[50] Field of Search .......... 235/152, 156, 164, 168

[56] References Cited

UNITED STATES PATENTS 3,414,720 12/1968 Battarel .......... 235/164

*Primary Examiner*—Malcolm A. Morrison
*Assistant Examiner*—James F. Gottman
*Attorney*—Curphey & Erickson

ABSTRACT: The position of the least or most significant ONE-bit in a binary word is determined by adding the binary word to another binary word of the same length but consisting of all ONE-bits. The carry bits which are generated in the addition are complemented and ANDED with the original word to result in a binary word consisting of all ZERO-bits except for a ONE-bit at the position of the least significant bit in the original binary word.

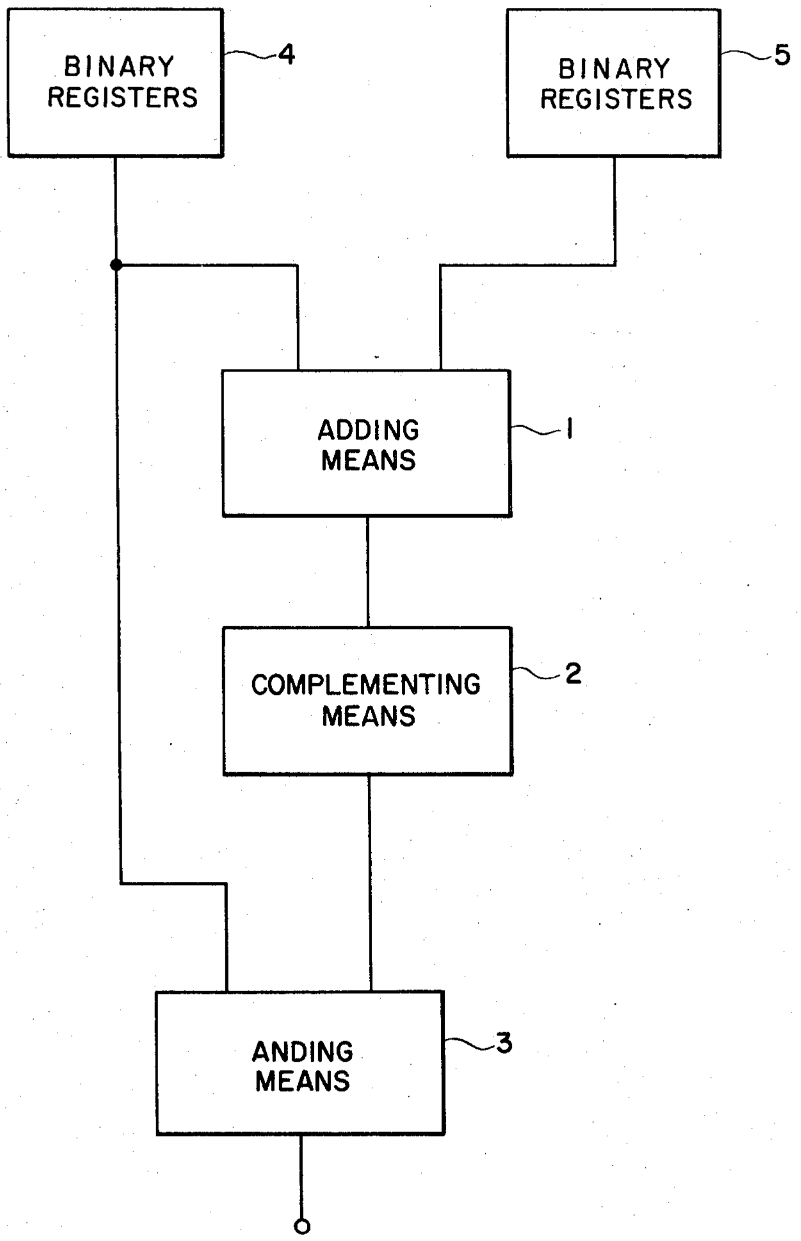
INVENTORS
JOHN S. BUCHAN
LEONARD C. BEAUMONT
BY Curphey & Erickson
PATENT AGENTS

DEVICE FOR DETERMINING LEAST SIGNIFICANT "ONE" IN A BINARY WORD

This invention relates to electronic digital computers and more particularly to the arithmetic logic units of such computers.

Two logic functions which are common to arithmetic logic units of most digital computers are those of finding the position of the least significant bit and the position of the most significant bit of a binary word.

General purpose digital computers generally extend the range of numbers they can operate with by scaling the numbers before usage. Scaling involves the determining of the position of the most significant 1-bit and the shifting of the word until that bit is immediately to the right of a decimal point. The scale factor which represents the amount of shift that was required to perform the above function is stored in the computer memory and is retrieved whenever the word associated with it is used for computation.

On the other hand, other digital computers, as for example a type of electronic central processing unit used in a telephone central office, requires the determination of the position of the least significant 1-bit of a binary word. The bits of a binary word may, for instance, serve as busy or idle indicators, the 1-bits of the binary word being processed sequentially from right to left.

One prior method of determining the position of the least or most significant bit of a binary word involved the use of matched sets of instructions where each instruction normally represents one step in a computer program. The word of which the position of the least or most significant 1-bit is required to be known is shifted right or left, one position at a time, and the contents of the new least or most significant bit position is compared with a 1-bit until positive matching results. This method is very time consuming since at least two instructions are required for every shift-match cycle.

Another method, called priority gating, involves applying the word, of which the position of the least or most significant 1-bit is required to be known, to a chain of gates. Each gate has one input from a corresponding bit position of the word and other inputs corresponding to the number of other bits before its respective bit in the sequence. For example, a 16-bit word requires a chain of 16 gates, the 16th gate having 16 inputs. This creates wiring problems due to the large number of interconnections, (i.e. outputs of 16 gates connecting to 136 inputs of 16 gates) and enhances the problem normally associated with fan-in and fan-out considerations for logic gates. Logic gates in general, but especially integrated circuit logic gates are limited as to the number of inputs that may be connected to them due to the leakage current of their input diodes, and to the number of gates that they may connect to, due to the loading of the active element of the gate. These problems can be partially alleviated by grouping the bits, for example into four groups, but at the expense of more gates for interconnecting the groups.

According to our invention, there is provided a novel structure and method for determining the position of the least or most significant 1-bit in a binary word using the existing circuitry common to virtually all digital computers which have arithmetic logic units, plus an additional small number of logic gates. Also, the operation requires a single instruction regardless of where the least or most significant 1-bit appears in the binary word. Therefore, the invention described herein provides a novel structure and method for determining the position of the least or most significant 1-bit in a binary word, which is economical, and which lends itself to high speed of operation.

According to our invention, there is provided an adding means to add the first binary word, of which it is required to determine the position of the least or most significant 1-bit, to a second binary word of the same length as the first binary word but consisting of all 1-bits. This produces a third binary word consisting of carry bits, one carry bit corresponding to each bit position of the first binary word. Also, there is provided a complementing means to complement the third binary word to form a fourth binary word, and an ANDING means to perform an ANDING function of the fourth and first binary words. A fifth binary word is thus produced consisting of all 0-bits except for a 1-bit at the bit position corresponding to that of the least significant 1-bit in the first binary word.

A better understanding of the invention, and its mode of operation may be obtained upon consideration of the following description and the accompanying single drawing which shows a block diagram of one embodiment of this invention for determining the position of the least significant 1-bit in a binary word.

Referring to the drawing, a block diagram of the arrangement of basic elements of the broadest aspect of this invention is shown. An adding means 1 having a first and second input port is connected to a complementing means 2 having a third input port and a second output port, via a first output port of the adding means and a third input port of the complementing means. The adding means has first and second input ports in order that two binary words may be applied thereto to be added together.

An ANDING means 3 having fourth and fifth input ports, and a third output port, is connected to the complementing means 2 via its fourth input port and the second output port of the complementing means.

A means 4 such as a register is provided for applying a first binary word to the adding means 1 and to the ANDING means 3, and may be connected to the first input port of the adding means 1 and fifth input port of the ANDING means 3. A means 5 such as a register is provided for applying to the second input port of the adding means 1 a second binary word of the same bit length as the first binary word, but consisting of all 1-bits.

In operation, therefore, it may be seen that a first binary word of predetermined bit length is applied to the first input port of the adding means 1 by the means 4 and a second binary word consisting of all 1-bits, and of the same bit length as the first binary word, is applied to the second input port of the same adding means 1 by the means 5. After adding operation has been completed, a third binary word appears at the first output port of the adding means 1, consisting solely of carry bits, one carry bit corresponding to each bit position of the first binary word. These carry bits result from the adding of the first and second binary words. The most significant or "overflow" carry bit resulting from the addition of the two most significant bits may be ignored since it does not contribute anything to the function under consideration.

The third work is then applied to the complementing means 2 via its second input port, where a complementing function takes place, and a fourth word resulting from the complemented function of the third work appears at the second output port of the complementing means 2.

The fourth word is then applied to the ANDING means 3 via the fourth input port thereof. Similarly, the means 4 applies the first binary word to the fifth input port of the ANDING means and the AND function of the first and fourth words appears at the third output port of the ANDING means 3 in the form of a fifth binary word. The resulting fifth binary word will always consist of all 0-bits except for a 1-bit at the bit position corresponding to the position of the least significant 1-bit in the first binary word.

It may be seen that in order to put into practice the discovery described above, the following process steps should be followed:

1. Adding a first binary word to a second binary word in an adding means, the second binary word being of equal bit length to the first binary word and consisting of all 1-bits, to form a third binary word consisting of carry bits, one carry bit corresponding to each bit position of the first binary word;

2. Complementing the third binary word is a complementing means to form a fourth binary word;

3. ANDING the fourth binary word with the first binary word in an ANDING means to form the aforementioned fifth binary word.

In order to further clarify the operation of the logical device described above, an example of a binary word passing through the device will be explained. For the purpose of the explanation, an 8-bit binary word will be used.

Let us assume that it is required to determine the position of the least significant 1-bit of a first binary word which appears in the means 4.

8 7 6 5 4 3 2 1 BIT POSITIONS 0 0 1 1 0 1 1 0 FIRST BINARY WORD

It is obvious from looking at the first binary word that the logical device should determine that the least significant 1-bit is at bit position 2.

The means 4 applies the first binary word to the first input port of the adding means 1 and the means 5 applies a second binary word, of the same length as the first binary word but consisting of all 1-bits, to the second input port of the adding means 1. The adding means adds the two binary words in the normal binary manner producing a third binary word for the carry bits:

| | |
|---|---|
| 9 8 7 6 5 4 3 2 1 | BIT POSITIONS |
| 0 0 1 1 0 1 1 0 | FIRST BINARY WORD |
| 1 1 1 1 1 1 1 1 | SECOND BINARY WORD—All 1-bits |
| 1 1 1 1 1 1 1 0 0 | CARRY BITS |
| 1 1 1 1 1 1 0 0 | THIRD BINARY WORD |

The carry bits corresponding to the bit positions of the first binary word form a third binary word. The leftmost carry bit (bit position 9) resulting from the addition of the two most significant bits may be ignored.

The third binary word which appears at the first output port of the adding means 1 is then applied to the third input port of the complementing means 2 which complements it to form the fourth binary word which appears at its second output port.

8 7 6 5 4 3 2 1 BIT POSITIONS 0 0 0 0 0 0 1 1 FOURTH BINARY WORD

The fourth binary word is then applied to the fourth input port of the ANDING means 3 and the first binary word is applied to the fifth input port of the same ANDING means. The latter produces the AND logic function of the first and fourth binary words to form a fifth binary word.

| | |
|---|---|
| 8 7 6 5 4 3 2 1 | BIT POSITIONS |
| 0 0 0 0 0 0 1 1 | FOURTH BINARY WORD |
| 0 0 1 1 0 1 1 0 | FIRST BINARY WORD |
| 0 0 0 0 0 0 1 0 | FIFTH BINARY WORD |

The fifth binary word consists of all 0-bits except for a 1-bit at position 2 which corresponds to that of the least significant 1-bit in the first binary word.

In a practical embodiment of the structure described, the adding means 1 may be any well-known full binary adder while the complementing means and the ANDING means may consist of well known arrays of inverter logic gates and AND logic gates respectively. Means 4 and 5 may be storage registers of a predetermined length at least with capacity to hold the first and second words respectively. Also, it may be appreciated that the means forming the structure described above may each consist of arrays of other logic gates such as NOR or NAND gates.

The above structure and method for determining the position of the least significant 1-bit of a binary word is equally applicable to digital data processors using any word length.

Many full binary adders of conventional design have an output port from which may be obtained a complement of the carry bit words generated in an addition. In this case, it may be seen that this output port may be connected directly to the fourth input port of the ANDING means thereby obviating the necessity for the logic gates forming the complementing means. Therefore, the facility for determining the position of the least significant 1-bit in the binary word may be obtained at the added expense of only the ANDING means 3.

Another advantage of the novel structure and method described above is that the same logical device may be used to determine the position of the most significant 1-bit of a binary word with only slight modifications. These consist of inverting the relative position of each bit of the first word from a more significant to a less significant position and from a lesser to a more significant position. Then, the position of the least significant 1-bit of the inverted word is determined in the manner described above and the resulting fifth binary word is obtained at the output port of the ANDING means. The fifth binary word is reinverted as described above and the position of the 1-bit contained therein will correspond to the position of the most significant 1-bit in the first binary word. The inversion of the relative position of the bits within the first and fifth binary words may be obtained by simple crossover wiring interconnections as for example between points in a pair of registers.

We claim:

1. A logical device for determining the position of the least significant 1-bit in a binary word consisting of 1-bits and/or 0-bits comprising:
   a. an adding means for adding a first binary word and a second binary word of the same length as said first word but consisting of all 1-bits to produce a third binary word consisting of carry bits;
   b. a complementing means connected to the adding means for complementing the third binary word to produce a fourth binary word;
   c. an ANDING means connected to the complementing means for ANDING the fourth binary word and the first binary word to produce a fifth binary word consisting of all 0-bits except for a 1-bit at the bit position corresponding to the position of the least significant 1-bit in the first binary word.

2. A logical device for determining the position of the least significant 1-bit in a binary word, consisting of 1-bits and/or 0-bits comprising:
   a. an adding means having first and second input ports and a first output port, for adding a first binary word and a second binary word of the same length as said first word but consisting of all 1-bits which may appear respectively at said input ports, and for producing at the first output port a third binary word consisting of carry bits, one carry bit corresponding to each bit position of the first binary word;
   b. A complementing means having a third input port to which the third binary word may be applied, for complementing the third binary word to form a fourth binary word, and having a second output port at which the fourth binary word may appear;
   c. An ANDING means having a fourth input port to which the fourth binary word may be applied, a fifth input port to which the first binary word may be applied, and a third output port, for ANDING the first and fourth binary words to form a fifth binary word which may appear at the third output port, said fifth binary word consisting of all 0-bits except for a 1-bits at the bit position corresponding to the position of the least significant 1-bit in the first binary word.

3. A logical device as defined in claim 2, further comprising:
   a. first means for applying the first binary word to the first and fifth input ports; and
   b. means for applying the second binary word of the same bit length as the first binary word but consisting of all 1-bits, to the second input port.

4. The method for determining the position of the least significant 1-bit in a first binary word consisting of 1-bits and/or 0-bits, in a logical device, comprising the steps of:

a. applying the first binary word to a first input port of an adding means;
b. applying a second binary word of the same length as the first binary word, but consisting of all 1-bits, to a second input port of an adding means;
c. adding the first binary word to the second binary word in the adding means, resulting in the generation of a third binary word consisting of carry bits, one carry bit corresponding to each bit position of the first binary word;
d. complementing the third binary word in a complementing means to obtain a fourth binary word; and
e. ANDING the first binary word with the fourth binary word in an ANDING means, resulting in the fifth binary word consisting of all 0-bits except for a 1-bit at the bit position corresponding to the position of the least significant 1-bit in the first binary word.